United States Patent [19]
Grimwood et al.
[11] Patent Number: 4,634,536
[45] Date of Patent: Jan. 6, 1987

[54] SEPARATING SYSTEMS

[75] Inventors: Geoffrey L. Grimwood, Holmfirth; Geoffrey G. Brook, Huddersfield, both of England

[73] Assignee: Thomas Broadbent & Sons Limited, West Yorkshire, England

[21] Appl. No.: 747,153

[22] Filed: Jun. 20, 1985

[30] Foreign Application Priority Data

Jun. 26, 1984 [GB] United Kingdom ................ 8416220

[51] Int. Cl.[4] .............................................. B01D 45/12

[52] U.S. Cl. ................................ 210/781; 210/360.2; 210/361; 210/370; 210/371

[58] Field of Search .................. 210/781, 360.1, 360.2, 210/361, 369, 370, 371

[56] References Cited

U.S. PATENT DOCUMENTS 2,795,635 6/1985 McBride ......................... 210/380.1

Primary Examiner—Frank Sever
Attorney, Agent, or Firm—Charles F. Meroni, Jr.

[57] ABSTRACT

A method of separating solid particles from the liquid constituent of a slurry, containing solids having a "wide" particle size distribution, that is, a size distribution wherein the equivalent diameter of particles in the slurry ranges between at least 15 microns and 150 microns. The method uses a screen bowl centrifuge and comprises: (a) establishing a bed of solids on the screen section of the centrifuge whose maximum radial thickness is greater than 15 times the mean particle equivalent diameter of said solids in the slurry; (b) operating the scroll of the centrifuge at a speed within the range of 0.5 to 10% of the bowl speed; and (c) returning at least a portion of the solids contaminated centrate from the centrifuge to the interior of the screen section of the bowl so as to deposit the centrate on the solids passing over the screen section at or adjacent a region of maximum solids thickness.

4 Claims, 5 Drawing Figures

SEPARATING SYSTEMS

The present invention relates to systems for separating solid particles from a slurry and in particular to such separating systems which utilise a screen bowl decanting type centrifuge.

Systems for separating solid particles from liquid which utilise a screen bowl decanting type centrifuge have been restricted in the minimum size of solids particle that can be separated. Whilst this minimum particle size varies with the difference in specific gravities of the liquid and the solid, the dimensions and speed of the centrifuge and the volumetric throughput, in practice this minimum particle size falls in the range 1 to 15 microns.

In a primary stage of the separation, the centrifuge separates those particles larger than the minimum particle size from the slurry, but those particles smaller than the minimum particle size (referred to hereinafter as "fine solids") remain as contaminants in the fluid (centrate) discharged from the centrifuge. Secondary and tertiary stages of separation are then carried out which recover the remaining fine solids from the centrate. The secondary stage usually involves the use of a settling tank whilst the tertiary stage may involve the use of a further solid bowl decanting centrifuge.

It is an object of the present invention to provide a simplified separating system for separating solids from a slurry, which dispenses with the tertiary stage of the known systems.

In accordance with the invention there is provided a method of separating solid particles from the liquid constituent of a slurry, containing solids having a "wide" particle size distribution, that is, a size distribution wherein the equivalent diameter of particles in the slurry ranges between at least 15 microns and 150 microns, the method using a screen bowl centrifuge and comprising:

(a) establishing a bed of solids on the screen section of the centrifuge whose maximum radial thickness is greater than 15 times the mean particle equivalent diameter of said solids in the slurry;

(b) operating the scroll of the centrifuge at a speed within the range of 0.5 to 10% of the bowl speed; and (c) returning at least a portion of the solids contaminated centrate from the centrifuge to the interior of the screen section of the bowl so as to deposit the centrate on the solids passing over the screen section at or adjacent a region of maximum solids thickness.

In a preferred arrangement, at least a portion of the centrate from the centrifuge contaminated with the fine solids is returned, preferably by way of a settling tank (or equivalent), to the interior of the screen section of the bowl by way of an auxiliary feed pipe and so arranged as to cause the centrate to be deposited on the solids passing over the screen section, said solids having been separated in the solid bowl section of the centrifuge and forming a thick bed.

The invention is described further hereinafter, by way of example only, with reference to the accompanying drawings, in which.

Figure 1:
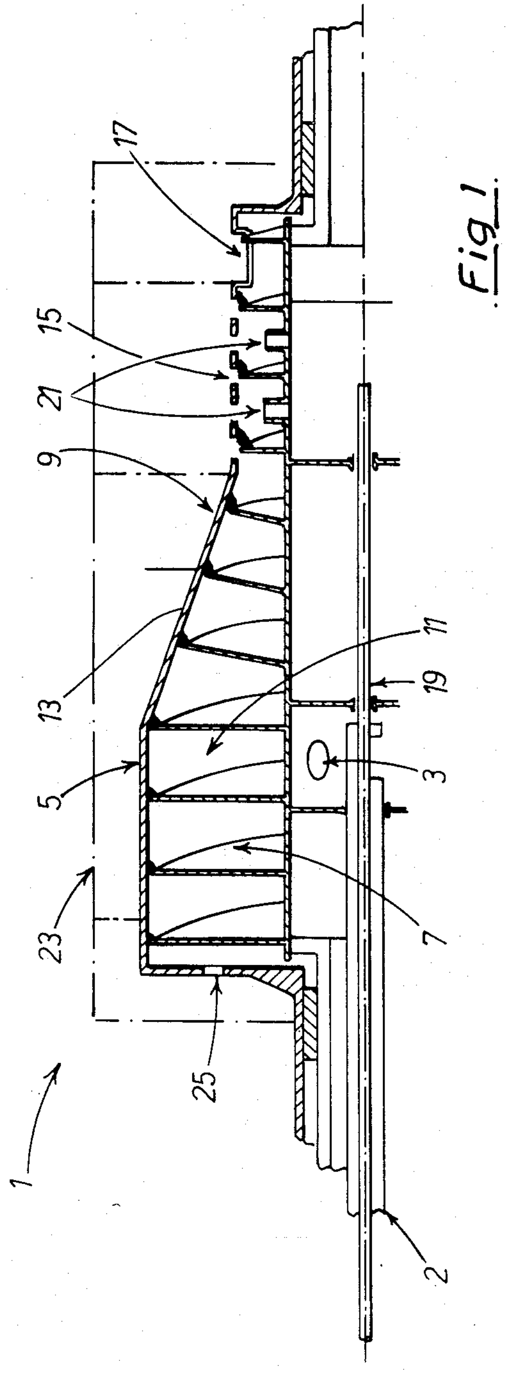
FIG. 1 is a sectional view of a known screen bowl decanter type centrifuge.

Referring to FIG. 1 there is shown a conventional screen bowl decanter type centrifuge. Slurry is fed via a main feed pipe 2 and feed ports 3 to a solid bowl section 5. Solids in the slurry of higher specific gravity than the liquid move outwards under the centrifugal forces generated by the rotation of the slurry in the bowl section 5 and are then scrolled by a helical conveyor 7 which rotates at a different speed to the bowl. During scrolling, the solids collected on the cylindrical bowl wall 3 are moved inwards, during their passage through a conical bowl section 9, towards the axis of rotation of the centrifuge, through the liquid surface 11 and along a conical beach section 13, thus separating some of the liquid from the scrolled solids by sedimentation. Subsequently the solids are scrolled over a screen section 15 where additional removal of liquid from the solid particles occurs by filtration, the liquid passing through slots in the screen section 15 and the dry solids discharging from a solids outlet 17. An auxiliary feed pipe 19 may be fitted to supply a liquid, to wash the solids on the screen section 15 via auxiliary feed ports 21. This wash liquid is collected in the casing 23 of the centrifuge and discharged for subsequent processing, separately from the centrate 24 (see FIG. 2), if required.

The centrate 24 in the bowl section 5 carries with it the fine solids that have not been deposited on the bowl wall by the centrifugal forces of rotation and is discharged from a liquid outlet 25.

Figure 2:
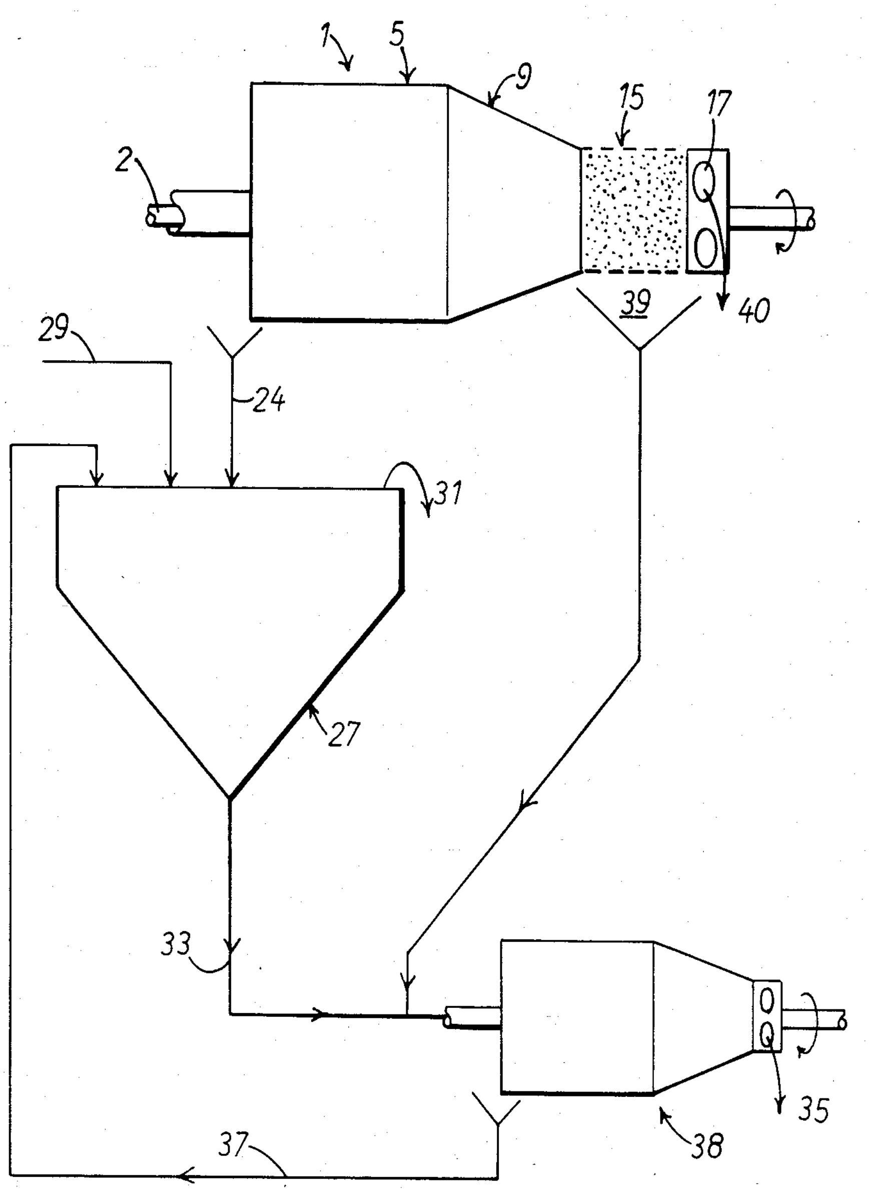
Fig 2 PRIOR ART
FIG. 2 is a diagrammatic view of a typical separating system incorporating primary, secondary and tertiary stages.

FIG. 2 shows one typical arrangement of a known system for separating solid particles from liquid that incorporates primary, secondary and tertiary separating stages. The primary separation stage is carried out by means of a screen bowl decanting type centrifuge as described above. During the secondary stage the centrate 24 passes to a large settling tank 27 to which flocculants 29 may be added to agglomerate the fine solids and assist settling. Clear centrate 31 overflows this settling tank 27 and concentrated contaminated centrate 33 is withdrawn from the bottom of the settling tank 27. The centrate 33 passes to the tertiary separation stage where fine solids 35 are separated and the centrate 37 from this stage, if still contaminated, is re-circulated through the secondary process.

The liquid/fine solids mixture 39 passing through the screen section 15 of the decanting centrifuge may be pumped to the secondary or tertiary separations, depending upon the results required.

The tertiary separation may be carried out by a solid bowl decanting centrifuge 38, a belt press filter, a vacuum type filter or other known equipment to discharge the fine solids 35 for mixing with the dry solids discharge 40 from the screen bowl decanter solids outlet 17.

The present invention is concerned with the design and mode of operation of the screen section 15 of a screen bowl decanting type centrifuge and the relationship between the size of the screen opening, the radial thickness of the solids passing over the screen and the particle size distribution of these solids.

Analyses of screen performance have been made using the following parameters:

(a) Using a bed of solids on the screen section 15 which has a radial thickness which is greater than 10 times the mean particle size of the solids contained in the slurry being processed;

(b) A relatively low differential scrolling speed defined as the difference in bowl speed and conveyor speed and being within the range of 0.5–10% of the bowl speed; and (c) Solids having a wide particle size distribution defined as wider than the range between the particle equivalent diameter of 15 microns and the particle equivalent diameter of 150 microns.

The analyses show three important aspects of screen operation when using these parameters:

(1) Following the initial separation of solids from liquid as the solids are scrolled clear of the liquid surface 11 and along the conical beach 13, a further separation phase occurs as the solids reach the screen when the liquid trapped in the interstices of the solids is removed by centrifugal force and filters through the screen openings—this is referred to as the first filtration stage. This occurs over the initial 20%–40% of the screen axial length.

(2) A final separation phase then occurs over the remaining portion of the axial length of the screen when additional liquid is separated by filtration through the screen, accompanied by some loss of very fine solids (less than 10–15 microns). The liquid separated during this second filtration phase is that attached by surface tension to the very large surface area of these fine solids and which pass through the screen openings.

(3) only a small quantity of fine solids (less than 10–15 microns) passes through the screen during the second phase of filtration. Using a screen with 200–250 microns openings about 90–95% of the solid particles below 200–250 microns pass over the screen with the slowly moving radially thick bed of solids and are discharged from the solids discharge outlet 17, provided the centrifuge is operated within the above parameters.

This use of the screen differs fundamentally from the "present art" of screening in which screens are used to separate solids and wherein all solids below the screen opening size pass through the screen with the bulk of the liquid and all solids above that size are retained on the screen in a wet state. The present invention uses the screen in conjunction with the above parameters to separate liquid in two filtration phases, the second phase being accomplished through the discharge of a small amount of fine solids passing through the screen, whilst conveying across the screen a large portion of fine solids whose dimensions are substantially smaller than the screen openings, together with the larger sized solids particles emerging from the sedimentation phase.

Figure 3:
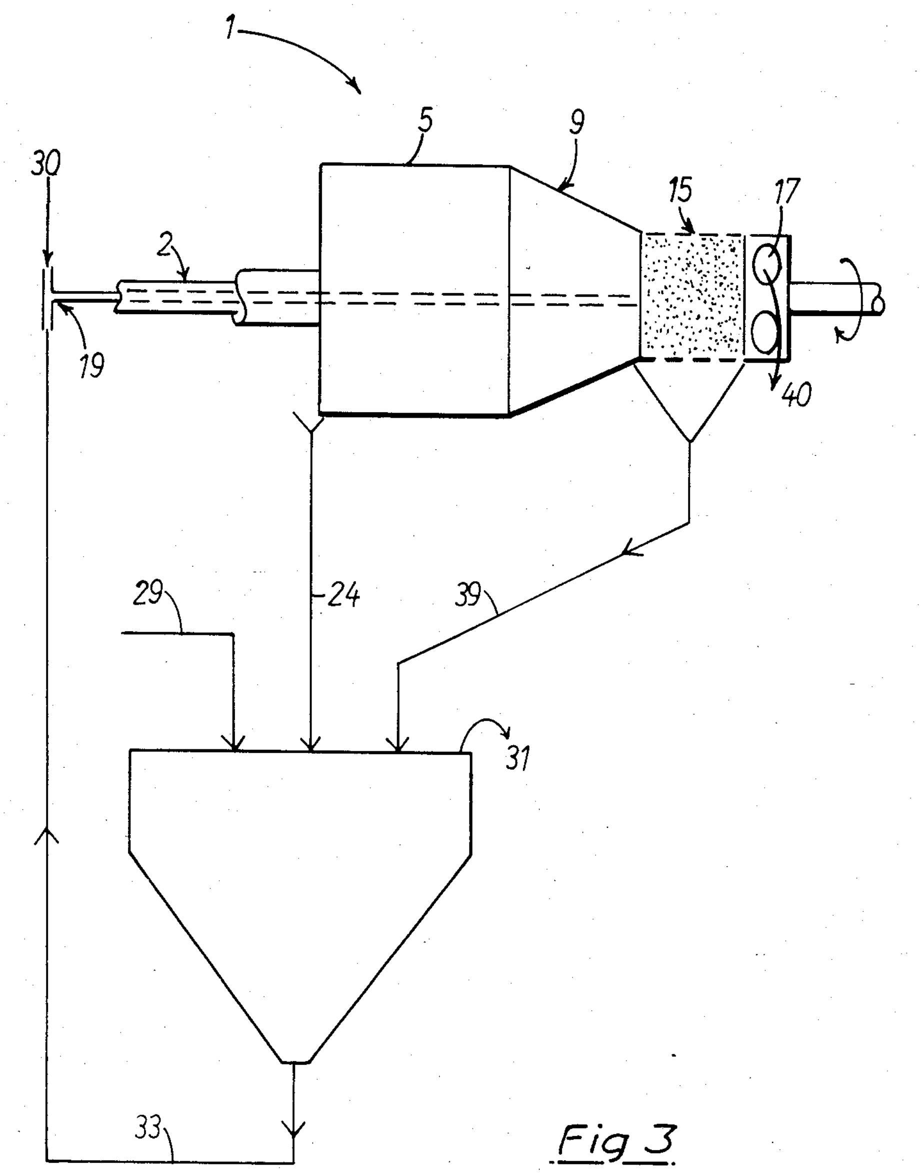
FIG. 3 is a diagrammatic view of a separating system in accordance with the present invention.

FIG. 3 shows diagrammatically a system in accordance with the present invention which dispenses with the tertiary separation stage. Instead, the concentrated contaminated centrate 33 is returned from the secondary separation stage to the screen section 15 of the decanting centrifuge in the primary stage and all separated solids are delivered to the single outlet 17. Here the contaminated centrate (mixed with additional flocculant 30, if necessary, to increase the agglomeration of the fine particles) is fed via the auxiliary feed pipe 19, to the screen section 15 of the screen bowl decanter in the primary separation stage.

Figure 4:
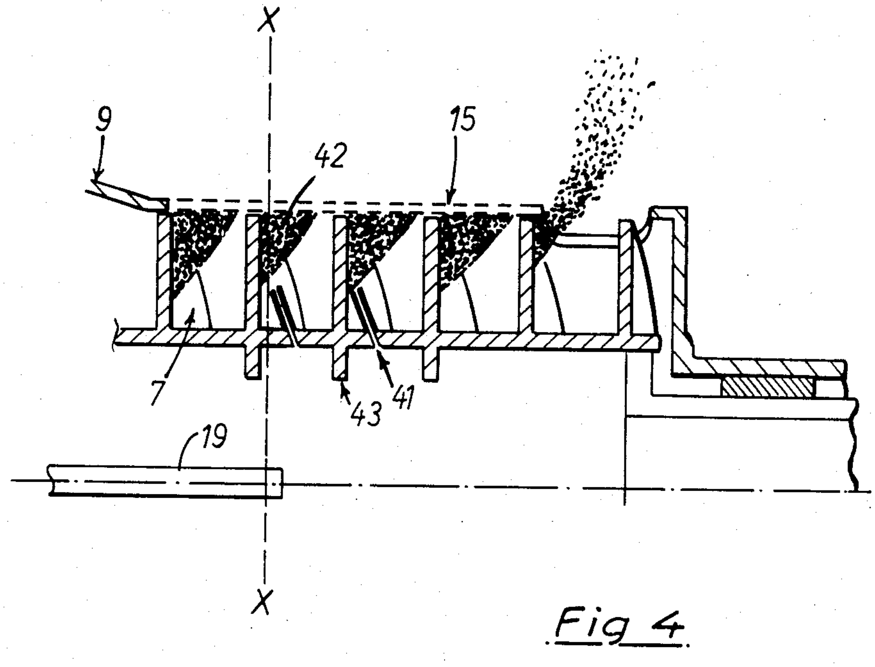
FIG. 4 is a sectional view of the screen section of a screen bowl decanter type centrifuge for use with the present invention.
Figure 5:
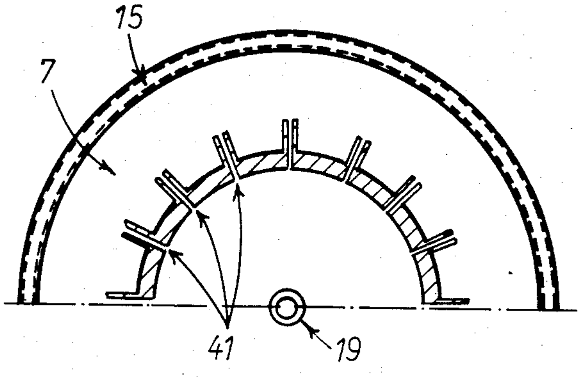
FIG. 5 is a sectional view along line X—X of FIG. 4.

As shown in FIGS. 4 and 5 the contaminated centrate 33 is carried through a multiplicity of nozzles 41 to the solids 42, which are scrolled over the screen 15, at the points where the radial thickness of the solids bed is a maximum and at points near the junction of the phase 1 and phase 2 filtration sections on the screen. When operated within the parameters given above, the agglomerated fine solids in the contaminated centrate 33 pass over the screen, trapped within the slowly moving radially thick bed of solids, and are discharged from the solids outlet 17, whilst the liquid separated by filtration passes through the radially thick bed of solids and the slotted screen as the liquid/fine solids mixture 39 which carries a small portion of the fine solids to the secondary separation stage for re-circulation.

The nozzles 41 are positioned so as to discharge the contaminated centrate 33 to the thickest radial section of the solids which are scrolled over the screen. A multiple arrangement of nozzles 41 is used to ensure even distribution of the contaminated centrate 33. Dividing plates 43 as shown in FIG. 4 are provided so that, by adjusting the axial position of the second liquid pipe 19, the axial position of the point at which the contaminated centrate 33 is delivered to the screen 15 can be positioned for the best performance, that is, between the phase 1 and phase 2 filtration zones on the screen.

By using the above system, the tertiary phase of separation is no longer needed. The fine solids lost to the centrate during the principal solid/liquid separation process are recirculated for recovery in the thick solids bed on the screen section of the centrifuge. All solids are discharged from the centrifuge of the primary separation stage, thus also yielding the further advantage of simplified solids handling following separation.

we claim:

1. A method comprising separating solid particles from the liquid constituent of a slurry, containing solids having a "wide" particle size distribution, that is, a size distribution wherein the equivalent diameter of particles in the slurry ranges between at least 15 mocrons and 150 mocrons in a screen bowl centrifuge by the steps of (a) establishing a bed of solids on the screen section of the centrifuge whose maximum radial thickness is greater than 15 times the mean particle equivalent diameter of said solids in the slurry:

(b) operating the scroll of the centrifuge at a speed within the range of 0.5 to 10% of the bowl speed; and (c) returning at least a portion of the solids contaminated centrate from the centrifuge, separately and remote from the slurry inlet to the centrifuge, to a point interior of the screen section of the bowl so as to deposit the centrate on the solids passing over the screen section at or adjacent a region of maximum solids thickness.

2. A method according to claim 1, wherein at least a portion of the centrate from the centrifuge, contaminated with the fine solids, is returned to the interior of the screen section of the bowl by way of an auxiliary feed pipe, the pipe being so arranged as to cause the centrate to be deposited on the solids passing over the screen section, said solids having been separated in the solid bowl section of the centrifuge and forming said bed of solids.

3. A method according to claim 2, wherein said portion of the centrate from the centrifuge is returned to the interior of the screen section by way of a settling tank.

4. A method according to claim 2 wherein flocculating material is mixed with the contaminated centrate, prior to its return to the interior of the screen section of the bowl, to increase an agglomeration of fine particles.

* * * * *